(12) United States Patent
Asano

(10) Patent No.: US 9,714,040 B2
(45) Date of Patent: Jul. 25, 2017

(54) UNIT BRAKE

(75) Inventor: Yoshio Asano, Kobe (JP)

(73) Assignee: Nabtesco Corporation, Tokyo (JP)

( * ) Notice: Subject to any disclaimer, the term of this patent is extended or adjusted under 35 U.S.C. 154(b) by 213 days.

(21) Appl. No.: 14/235,247

(22) PCT Filed: Jul. 2, 2012

(86) PCT No.: PCT/JP2012/004271
§ 371 (c)(1),
(2), (4) Date: May 12, 2014

(87) PCT Pub. No.: WO2013/014862
PCT Pub. Date: Jan. 31, 2013

(65) Prior Publication Data
US 2014/0231192 A1 Aug. 21, 2014

(30) Foreign Application Priority Data
Jul. 26, 2011 (JP) ................. 2011-163325

(51) Int. Cl.
F16D 51/00 (2006.01)
B61H 13/00 (2006.01)
(Continued)

(52) U.S. Cl.
CPC ............. B61H 13/005 (2013.01); B60T 1/04 (2013.01); B60T 17/086 (2013.01); B61H 1/00 (2013.01);
(Continued)

(58) Field of Classification Search
CPC .......... B60T 11/14; B60T 13/38; B60T 17/08; F16D 67/04; F16D 2121/04; F16D 2123/00; F16D 49/12; F16D 59/02; F16D 25/063
(Continued)

(56) References Cited

U.S. PATENT DOCUMENTS 3,878,924 A * 4/1975 Nadas ................... B60T 17/081
188/196 D
3,970,173 A * 7/1976 Sander .................... F16D 65/56
188/196 D
(Continued)

FOREIGN PATENT DOCUMENTS

JP 1159391 A 3/1999
JP 11059391 A * 3/1999
(Continued)

*Primary Examiner* — Anna Momper
*Assistant Examiner* — Mahbubur Rashid
(74) *Attorney, Agent, or Firm* — The Webb Law Firm

(57) ABSTRACT

Disclosed is unit brake, which is equipped with a cylinder apparatus in which a clutch mechanism that switches between transmitting or cutting off a biasing force of a spring brake part is disposed, is capable of preventing a braking force due to the spring brake part from unintentionally decreasing due to a meshing section of the clutch mechanism disengaging, and is of a size that can replace an existing unit brake, and maintains the performance of bearings in the clutch mechanism even with long-term use. The clutch mechanism of the unit brake includes: a nut member that rotatably screws on a spindle that is positioned in an area that communicates with the atmosphere, and is movably supported in a direction opposite to braking; a clutch that is disposed in a direction opposite to braking with respect to the nut member, and faces the nut member in the vicinity of the spindle; a clutch box that is formed in a cylinder shape, and houses the nut member and clutch on the inside; and bearings that rotatably support the nut member on the inside of the clutch box.

3 Claims, 5 Drawing Sheets

(51) Int. Cl.
- *B61H 1/00* (2006.01)
- *F16D 49/00* (2006.01)
- *F16D 65/28* (2006.01)
- *B60T 17/08* (2006.01)
- *B60T 1/04* (2006.01)
- *F16D 121/04* (2012.01)
- *F16D 123/00* (2012.01)
- *F16D 127/04* (2012.01)
- *F16D 121/06* (2012.01)

(52) U.S. Cl.
CPC .............. *B61H 13/00* (2013.01); *F16D 49/00* (2013.01); *F16D 65/28* (2013.01); *F16D 2121/04* (2013.01); *F16D 2121/06* (2013.01); *F16D 2123/00* (2013.01); *F16D 2127/04* (2013.01)

(58) Field of Classification Search
USPC .......... 188/74, 170, 203, 216; 475/298, 300, 475/138; 192/53.1
See application file for complete search history.

(56) References Cited

U.S. PATENT DOCUMENTS

| | | | | |
|---|---|---|---|---|
| 4,050,553 A | * | 9/1977 | Pollinger | F16D 65/66 188/196 D |
| 4,088,205 A | * | 5/1978 | Frania | F16D 65/56 188/196 D |
| 4,385,548 A | * | 5/1983 | Persson | B60T 17/081 188/196 D |
| 4,796,731 A | * | 1/1989 | Schmitt | F16D 65/56 188/196 D |
| 5,937,974 A | * | 8/1999 | Cathcart | B60T 17/083 188/153 R |
| 2011/0266102 A1 | * | 11/2011 | Elstorpff | B60T 17/08 188/196 V |

FOREIGN PATENT DOCUMENTS

| | | | | |
|---|---|---|---|---|
| JP | 2001206213 A | | 7/2001 | |
| JP | 2008101766 A | | 5/2008 | |
| JP | WO 2008108249 A1 | * | 9/2008 | ............ F16D 65/14 |
| JP | WO 2010070813 A1 | * | 6/2010 | ............ F16D 65/14 |
| JP | 2010164193 A | | 7/2010 | |

* cited by examiner (a)

(b)

UNIT BRAKE

CROSS-REFERENCE TO RELATED APPLICATIONS

This application is the United States national phase of International Application No. PCT/JP2012/004271 filed Jul. 2, 2012, and claims priority to Japanese Patent Application No. 2011-163325 filed Jul. 26, 2011, the disclosures of which are hereby incorporated in their entirety by reference.

TECHNOLOGY FIELD

This Invention relates to a unit brake with a regular brake part and a spring brake part.

BACKGROUND TECHNOLOGY

A cylinder device and a brake body attached to this cylinder device are equipped as a unit brake for vehicle braking, to activate the cylinder device, and bring a brake shoe retaining relative displaceability versus the brake body into contact with the vehicle wheel, to brake the rotation of the vehicle wheel. For the cylinder device in this type of unit brake, for example, in brake devices for rail vehicles, cylinder devices are known that can be activated with both a regular brake part activated with compressed air (compressed fluid) used in normal operations, and a spring brake part activated by a spring force even without use of compressed air, used for stopping the vehicle over a long time (see Patent Citation 1). In the cylinder device disclosed in Patent Citation 1, the regular brake part has a rod protruding and has installed a first piston used in opposition to a first pressure chamber and first spring, and the spring brake part has a rod penetrating and has installed a second piston used in opposition to a second pressure chamber and second spring. In addition, compressed air is supplied to the first pressure chamber, to move the first piston in the brake direction, in resistance to the first spring added force, and furthermore, compressed air is exhausted from the second pressure chamber, to move the second piston in the brake direction, using the second spring added force.

In addition, in the above-mentioned cylinder device, a clutch function is installed that links the rod and second piston are linked, and releases that link, switching between transmitting or blocking the spring brake part added force. In this clutch mechanism, rotatability is supported versus the second piston, and a nut member screwed into the rod is installed. Moreover, this clutch mechanism is configured so as to move from a state where compressed air is supplied to the second pressure chamber to an exhaust state, and the nut member moves together with the second piston versus the rod, by the second spring added force, so that the rod and second piston are linked to form a linked state. By contrast, in the state where compressed air is supplied to the second pressure chamber, this clutch mechanism is configured so that the link between the rod and second piston is released, to form a non-linked state. In this cylinder device, the clutch mechanism moves to the above-mentioned link state, and is designed so that the convex-concave teeth in the nut member in the clutch mechanism, and in the sleeve member that is the opposite-side member, are linked by mutual gripping, and the brake force is maintained in the spring brake part.

ADVANCED TECHNOLOGY CITATION

Patent Citation

Patent Citation 1: Laid Open No. 2008-101766 Publication

Patent Citation 2: Laid Open No. 2010-164193 Publication

SUMMARY OF INVENTION

Issues that Invention Attempts to Solve

In the above-mentioned clutch mechanism in the cylinder device disclosed in Patent Citation 1 (Laid Open No. 2008-101766 Publication), when the nut member moves together with the second piston, the forward tip parts of the convex-concave teeth in the nut member and sleeve member come into contact with each other first. At this time, contact resistance with the sleeve member that obstructed displacement of the rotation direction easily causes the nut rotation to be stopped. As a result, there are cases where the convex-concave teeth in the nut member and sleeve member do not fully grip all the way to the back, and the rod and second piston remain linked with only the forward tip parts gripped together. If left standing in this kind of linked state, the compressed air in the first pressure chamber of the regular brake part is steadily outgassed, and activation of the first pressure chamber causes the added force of the first piston to weaken, then the brake shoe or the carriage structural member formed from composite materials that is deflected by this added force, overlaps with the force from the spring element installed on the carriage compressed or expanded by this added force, leading to a reaction force from the brake shoe side, and this reaction from the brake shoe side causes the first piston to be pushed back slightly in a direction opposite to the brake direction, and at the same time, the rod formed as a unit with the first piston is also pushed back slightly in a direction opposite to the brake direction, so that the clutch mechanism gripped part, which had only been gripped at the forward tips only, comes completely loose, and the brake force for the spring brake part used as the parking brake, etc., is unintentionally relaxed. In particular, this tendency becomes much more notable when the first piston added force is large while parked because the reaction force from the brake shoe side also grows larger.

In addition, while use of the unit brake listed in Patent Citation 2 (Laid Open No. 2010-164193 Publication) solves the above-mentioned issue, there is a problem in that it cannot be exchanged as is for existing vehicles where the Patent Citation 1 (Laid Open No. 2008-101766 Publication) unit brake is used, because of an installation space problem. Furthermore, since the bearing used in the clutch mechanism of the unit brake listed in Patent Citation 2 (Laid Open No. 2010-164193 Publication) is used inside a compressed air atmosphere generated by a compressor, there is a problem of adverse effects due to humidity, etc. In particular, the said problem appears quite notably in cases of vehicles used overseas where dehumidification devices are not installed.

In a unit brake equipped with a cylinder device with a clutch mechanism installed for switching between transmission and blocking the added force of the spring brake part, this Invention takes the above-mentioned situation into consideration to set an objective to provide a unit brake that can prevent unintentional relaxation of the brake force by the spring brake part due to disengagement of the clutch mechanism gripping part, that is a size enabling replacement of existing items, and that can maintain the clutch mechanism bearing performance even during long-term use.

Method for Resolving the Issue (1) The unit brake related to this Invention is a unit brake equipped with a cylinder device with a spindle positioned in a region in communication with the atmosphere, a brake lever capable of swinging around a support axis through movement in the spindle axial direction, and a brake shoe receptacle linked to and driven by the brake lever, and the cylinder device has a first piston operating by opposing a first pressure chamber to a first spring positioned in a region in communication with the atmosphere and, with compressed fluid supplied to the first pressure chamber, has a regular brake part moving in the brake direction of the brake force generated by the first piston in resistance to the first spring added force, and a second piston operating by opposing a circular second pressure chamber installed opposing the first pressure chamber to a second spring installed concentrically on the outside of the first pressure chamber, and where a spindle has a specified gap for penetrating the central part, and has a spring brake part that moves from a state of supplying compressed fluid to the second pressure chamber to an exhausting state where the second piston moves in the brake direction by the second spring added force, a nut member rotatably screwed in versus the spindle, and with clutch part installed on the anti-brake direction in the opposite direction from the brake direction, a clutch engaged in the nut member clutch area on the side opposing the said nut member in the area around the spindle that was positioned in the anti-brake direction in a direction opposite to the brake direction versus the nut member, a clutch box forming a cylinder and housing the nut member and clutch on its inside, and a supporting bearing that can rotate the nut member versus the clutch box on the inside of the clutch box, and furthermore, the clutch is equipped with a clutch mechanism where displacement of the brake direction and anti-brake direction versus the clutch box is enabled, and the rotation direction displacement is regulated, and the clutch mechanism is positioned in a region where the first spring is positioned, on the inside of the circular ring of the second pressure chamber, and further in the brake direction than the second piston, with compressed fluid also exhausted from the second pressure chamber, so that the clutch is moved by the second spring added force, together with the second piston, in relation to the clutch box, to engage the clutch part of the nut member, and to enter a linked state where the spindle and second piston are linked and the nut member is non-rotatable, and compressed fluid is supplied to the second pressure chamber, resulting in the clutch becoming separated from the nut member, to become a non-linked state where the link between the spindle and second piston is released.

According to the above-mentioned configuration, the clutch opposing the nut member in the area around the spindle that was positioned in a region in communication with the atmosphere is positioned in the anti-brake direction versus the nut member, and when the clutch mechanism is moved in a linked state, the clutch moves together with the second piston to grip the clutch part of the nut member. In addition, the nut member screwed into the spindle and rotatably supported is supported to enable moving in the anti-brake direction. For this reason, if the compressed fluid in the first pressure chamber of the regular brake part is slowly outgassed, the first piston added force is weakened due to action of the first pressure chamber, and the first piston is pushed in the anti-brake direction by the spring-back reaction force from the brake shoe side, the nut member will be pushed in deeply gripping direction toward the clutch. With this action, even if the compressed fluid in the first pressure chamber is outgassed and the spring-back reaction force from the brake shoe side is activated, the disengagement of the gripping part with the nut member and clutch in the clutch mechanism is prevented. As a result, unintentional relaxation of the brake force in the spring brake part that is used as a parking brake, etc., is prevented.

In addition, with the above-mentioned configuration, the loosening of the mutual gripping part in the clutch mechanism, and the unintentional relaxation of braking force due to the spring brake part can be prevented. Furthermore, since a protruding part as seen in Patent Citation 2 is not generated in the cylinder back part, the installation space problem can also be solved.

In addition, with the above-mentioned configuration, since the first pressure chamber in the anti-brake direction of the clutch box holding the bearing is installed, exposure of the bearing to the compressed fluid can be prevented. In addition, in the same way, since the second pressure chamber on the outer side of the clutch box holding the bearing on the inner side is installed, exposure of the bearing to the compressed fluid can be prevented. Furthermore, since air surrounding the bearing flows smoothly, even if the atmosphere becomes humid, if the atmosphere afterward becomes drier, the atmosphere around the bearing also dries out. As a result, since grease applied to the bearing can be prevented from deterioration due to oil or water incorporated in the compressed fluid, it can maintain performance even through long-term use.

(2) In the above-mentioned unit brake, the spindle has a specified gap for penetrating the central part of the clutch, the clutch disengagement spring that applies force to the clutch in the anti-brake direction versus the clutch box is positioned concentrically on the outer side of the nut member, and the bearing is installed so that it faces the region where the clutch disengagement spring is positioned.

With the above-mentioned configuration, the air in the atmosphere passes through a specified gap formed between the spindle and clutch, and transits between the clutch and nut member to adequately supply the region where the clutch disengagement spring is positioned. It follows that, even if the atmosphere becomes humid, if the atmosphere afterward becomes drier, the air in the region where the clutch disengagement spring is positioned also dries out. As a result, grease applied to the bearing can more surely prevent deterioration due to a humid atmosphere.

Figure 1:
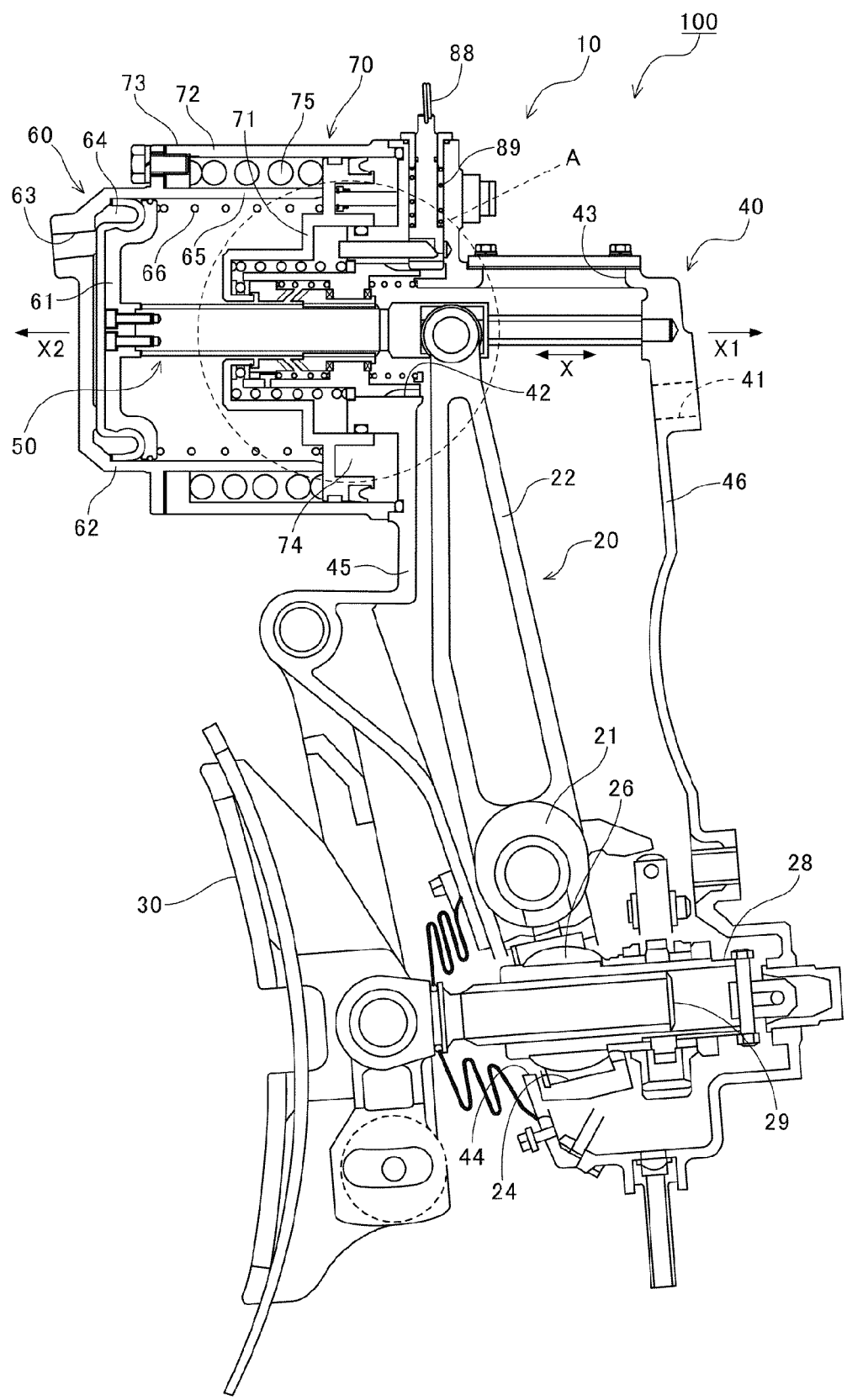
FIG. 1 Cross-section illustration showing the general configuration of the unit brake applied to the first Embodiment of the Invention.
Figure 2:
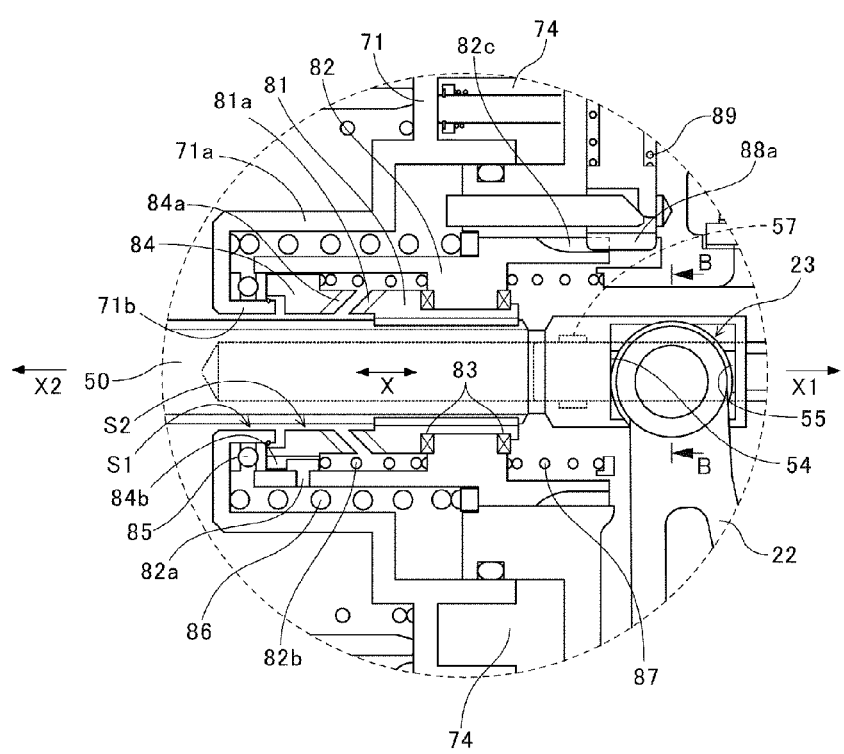
FIG. 2 Partial expanded illustration of the region shown at FIG. 1A.

EXPLANATION OF KEY CODE 100, 100a Unit brake
10 Cylinder device
20 Brake lever
30 Brake shoe receptacle
50, 50a Spindle
60 Regular brake part 61 first piston
64 first pressure chamber
66 Return spring member (first spring)
70 Spring brake part
71 second piston
71b Side wall
74 second spring chamber
75 Spring member (second spring)
81 Nut member
82 Clutch box
83 Bearing
84 Clutch
S1 Gap
S2 Gap

DESCRIPTION OF THE INVENTION

Here follows a description of the unit brake related to the Embodiment of this Invention, with reference to the illustrations.

<General Configuration of Unit Brake 100>

The unit brake 100 related to the Embodiment of this Invention is configured as a railroad car brake device. This unit brake 100 is equipped mainly with a cylinder device 10 for generating force, a brake lever 20 enabling swivel motion versus the movement of the cylinder device 10, a brake shoe receptacle 30 that can be moved forward and back by the swivel motion of the brake lever 20, and on which is mounted a brake shoe not shown in the illustration, a casing 40 that is formed in a hollow shape, and with an interior that enables communication with the atmosphere. In this casing 40, a connection hole 41 is formed, and a bolt not shown in the illustration inserted into this connection hole 41 is set so that the casing 40 can be fixed to a vehicle carriage.

<Brake Lever 20>

The brake lever 20 is housed in the casing 40. This brake lever 20 is supported by a rotatable spindle 21 mounted inside the casting 40. Also, the brake lever 20 is distributed in a stance that extends in the up and down directions.

The spindle 21 is installed in the intermediate area of the brake lever 20. Also, the brake lever 20 is formed as an arm part 22 on the side higher than the spindle 21, and a bearing hole 24 is installed on the side lower than the spindle 21.

A spherical bearing 26 is fitted into the bearing hole 24, and a sheathed rod 28 is fixed into the inner ring of this spherical bearing 26. The sheathed rod 28 is formed in a cylindrical shape, with a female screw cut on the inner surface. Also, a spindle 29 is screwed into the sheathed rod 28 female screw. With this action, the spindle 29 can have the protrusion volume adjusted in relation to the sheathed rod 28.

<Casing 40>

An upper side first opening 42, upper side second opening 43, and lower side opening 44, are formed in the casing 40. The upper side first opening 42 is formed in the upper part of the casing 40 vehicle wheel side sidewall 45 (side wall on the left side of FIG. 1), and a cylinder device 10 is attached to plug up this upper side first opening 42.

The lower side opening 44 is formed in the lower part of the vehicle wheel side sidewall 45. The spindle 29 passes through the lower side opening 44 to protrude toward the vehicle wheel side, and a brake shoe receptacle 30 is installed at the tip part.

A ventilation cylinder 40a is installed in the lower part of the casing 40, and there is communication between the outside atmosphere and the interior of the casing 40.

<Cylinder Device 10>

The cylinder device 10 is equipped with a spindle 50 with a multiple thread screw on the side surface, and this spindle 50 is moved along the axial direction to swivel the brake lever 20.

This cylinder device 10 is mainly equipped with the above-mentioned spindle 50, a regular brake part 60 used for decelerating or stopping a running vehicle, a spring brake part 70 used for vehicle parking, etc., and a clutch mechanism. The regular brake part 60 and spring brake part 70 are configured so as to be operated by the shared spindle 50.

<Regular Brake Part 60>

The regular brake part 60 operates through compressed and other fluid pressure force. This regular brake part 60 is equipped with a first piston 61 connected to the base end part of the spindle 50, a return spring member 66 positioned in a region providing the casing 40 air (equal to atmospheric pressure) from grooves in the multiple thread screw of the spindle 50 installed so as to penetrate the second spindle 71 described below, or gaps in each member, or in other words, a region communicating with the atmosphere, and a cylindrical first cylinder body 62 with bottom that can swivel-handle the first piston 61.

A first port 63 for supplying and exhausting compressed fluid is installed in the first cylinder body 62, and inside the first cylinder body 62, a first pressure chamber 64 is formed in communication with this first port 63. In the first pressure chamber 64, compressed air and other compressed fluids are supplied or exhausted in response to the specified brake operation, and the first piston 61 moves in resistance to the added force of the return spring member 66. Also, the first pressure chamber 64 is formed from the first piston 61 and the first cylinder body 62. This first pressure chamber 64 is partitioned in the anti-brake direction by a clutch box 82 that is described below.

<Spring Brake Part 70>

The spring brake part 70 activates with a spring elastic force due to a spring member 75, described below. This spring brake part 70 is penetrated by the spindle 50, and equipped with a second piston 71 movable in the axial direction (arrow X direction) of the spindle 50, and a second cylinder body 72 that can swivelably house the second piston 71. The second cylinder body 72 has a trunk part 73 installed on the outward circumference side of the trunk part 65 of the first cylinder body 62. In addition, the second piston 71 is configured to be contactable to the tip area of the trunk part 65 of the first cylinder body 62. The second cylinder body 72 is fixed in the casing 40. Between the second piston 71 and the casing 40 vehicle wheel side sidewall 45 is formed a second pressure chamber 74 that supplies compressed air and other compressed fluids by way of a second port (omitted from the illustration). This second pressure chamber 74 is formed from the second piston 71, the casing 40, and the second cylinder body 72. In addition, the second pressure chamber 74 is formed from a cylindrical shape installed facing the first pressure chamber 64. Also, the second pressure chamber 74 is partitioned in the outer side of the clutch box 82, described below. In addition, the spindle 50 is installed maintaining and penetrating a specified gap in the central part of the second piston 71.

Also, a spring member 75 is installed on the side opposite the second pressure chamber 74 versus the second piston 71. This spring member 75 is positioned between the trunk part 65 of the first cylinder body 62 positioned on the inner side, and the trunk part 73 of the second cylinder body 72 positioned on the outer side, and also positioned concentrically on the outer side of the first pressure chamber 64, and is compressed by reception of fluid pressure inside the second pressure chamber 74. While a normal compressed fluid is introduced into the second pressure chamber 74, compressing the spring member 75, performance of a specified brake operation exhaust the compressed fluid inside the second pressure chamber 74, and the spindle 50 is moved in the brake direction (arrow X1 direction) based on the spring force of the spring member 75.

The second piston 71 of this Embodiment has a clutch housing part 71*a* where the central part of the spindle 50 side forms a bump on the first piston 61 side, and the clutch mechanism described below is housed on the inner side of this clutch housing part 71*a*. Also, in this Embodiment, in the tip area of the spindle 50 side of the second piston 71, a sidewall 71*b* is formed stretching along the axial direction (arrow X direction) of the spindle 50. A thrust bearing 85, described below, is held in this sidewall 71*b*. Also, in this Embodiment, a gap S1 where air can pass is formed between the sidewall 71*b* and the spindle 50.

Meanwhile, the return spring member 66 is positioned between the first piston 61 and the second piston 71. This return spring member 66 pressures the first piston 61 in the compression direction (anti-brake direction (arrow X2 direction) of the first pressure chamber 64, and when a compressed fluid is introduced to the first pressure chamber 64, it is compressed by this fluid pressure. Since normally there is no compressed fluid introduced inside the first pressure chamber 64, the spindle 50 moves in the anti-brake direction (arrow X2 direction) based on the spring force of the return spring member 66. Also, compressed fluid is introduced to the first pressure chamber 64 by the specified break force, and the spindle 50 moves in the brake direction (arrow X1 direction). Moreover, when the compressed fluid inside the first pressure chamber 64 is exhausted by the specified brake release operation, the spindle 50 is returned to the initial state by the spring force of the return spring member 66.

<Clutch Mechanism>

The clutch mechanism switches the nut member 81 rotation and fixed. Specifically, the clutch mechanism allows rotation of the nut member 81 versus the spindle 50 when the regular brake part 60 is driven, and fixes the nut member 81 versus the spindle 50 when the spring brake part 70 is driven. The clutch mechanism in the Embodiment, as is described below, is positioned in a region that does not interfere with the first pressure chamber 64 and second pressure chamber 74.

The clutch mechanism, not shown in the illustration, mainly has the nut member 81, the clutch box 82 housing the nut member 81 in its inner side, a bearing 83 rotatably supporting the nut member 81 versus the clutch box 82, a clutch 84 positioned opposing the nut member 81, a thrust bearing 85 rotatably supporting the clutch box 82 versus the second piston 71, a clutch box stay spring 86, and a clutch spring 87. This clutch mechanism is normally locked to disable rotation by a lock lever 88, described below.

The nut member 81 is rotatably screwed versus the spindle 50. In addition, the nut member 81 is rotatably supported by way of the bearing 83 versus the clutch box 82. With this action, the nut member 81 is rotated by relative motion of the spindle 50 and the clutch box 82. In addition, the nut member 81 is rotatably supported together with the clutch box 82 toward the anti-brake direction (arrow X2 direction) which is the reverse direction. Also, in the part facing the clutch 84 of the nut member 81, a mutually gripping (connecting) external gear 81*a* is formed in the external gear 84*a* of the said clutch 84.

In addition, when the clutch external gears 81*a*, 84*a* are connected, motion toward the brake direction and anti-brake direction is allowed versus the clutch box 82, but rotation direction displacement toward the spindle 50 axis area is restricted.

The clutch box 82 is formed as a cylindrical member positioned on the inner side of the nut member 81 and the clutch 84. A key 82*a* linking the said clutch box 82 and clutch 84 is fixed within this clutch box 82. This key 82*a* is positioned in a groove 84*b* formed in the clutch 84. With this action, the clutch 84 is in a state versus the clutch box 82 where rotation direction displacement centering on the spindle 50 axial direction is restricted, and it slides in parallel along the axial line direction (arrow X direction). In other words, the clutch box 82 slidably supports the clutch 84 along the second piston 71 movement direction.

In addition, in the clutch box 82 is installed a clutch disengagement spring 82*b* that adds force in a direction moving away from the nut member 81. This clutch disengagement spring 82*b* is installed on the inner side of the clutch box 82 (spindle 50 side), and concentrically on the outer side of the nut member 81 and clutch 84. In addition, the clutch box stay spring 86 is installed between the clutch box 82 and the second piston 71.

The clutch 84 is formed as a cylindrical member, and is positioned in the anti-brake direction (arrow X2 direction) versus the nut member 81. Also, in this Embodiment, a gap S2 where fluid can pass is formed between the clutch 84 and the spindle 50. Moreover, this clutch 84 is installed around the spindle 50 so as to face the nut member 81. The clutch 84 is rotatably supported by the second piston 71, by way of the thrust bearing 85, at the tip area of the anti-brake direction (arrow X2 direction). With this action, when the second piston 71 moves along the brake direction (arrow X1 direction) versus the spindle 50, based on the added force of the spring member 75, the clutch 84 also moves together with the second piston 71 in the brake direction (arrow X1 direction) versus the spindle 50, by way of the second piston 71 and the thrust bearing 85.

The above-mentioned clutch mechanism is a region where the return spring member 66 is positioned, and is positioned on the inner side of the second pressure chamber 74 ring. In addition, the position of the said clutch mechanism is positioned more in the brake direction (arrow X1 direction) than is the second piston.

The clutch mechanism transitions from a state where compressed air is supplied to the second pressure chamber 74, to a state where it is exhausted, and the clutch 84 is moved together with the second piston 71 in the brake direction (arrow X1 direction) versus the spindle 50, by the added force of the spring member 75, to set a linked state mutually gripped with the nut member 81 (mutually gripping the external gear 81*a* of the nut member 81 and the external gear 84*a* of the clutch 84), and linking the spindle 50 and the second piston 71.

Meanwhile, in the state where compressed air is supplied to the second pressure chamber 74, the clutch 84 becomes separated from the nut member 81 (the external gear 81*a* and external gear 84*a* are not mutually gripping), and the nut member 81 enters a freely rotating state. For this reason, when in the state where compressed air is supplied to the second pressure chamber 84, the clutch mechanism is set to a non-linked state where the link of the spindle 50 and the second piston 71 is released.

In the cylinder device 10, the lock lever 88 is installed to enable switching between the clutch mechanism locked state and unlocked state. A latch gear 82*c* is installed on the outer circumferential surface of the clutch box 82 brake direction (arrow X1 direction), and a lock gear 88a that is configured to enable connection with the said latch gear 82c is installed in the inner tip area of the lock lever 88. The lock lever 88 uses and added force member 89 to add force in the direction connecting the lock gear 88a to the latch gear 82c, and lifting up the lock lever 88 releases the connection between the latch gear 82c and lock gear 88a, which action puts the clutch box 82 in a rotatable state. This configuration enabling release of the clutch box 82 lock state is to enable manual release of the spring brake part 70 when a situation arises where for some reason the compressed fluid in the second pressure chamber 74 is exhausted, putting the spring member 75 of the spring brake part 70 in extended state (the spring brake part 70 is in an operations state).

<Spindle 50>

The spindle 50 has a screwing part formed by multiple screws on the outward circumference side, and an extension part extending in the axial direction (arrow X1 direction) from the tip of this screwing part. Also, the nut member 81 of the clutch mechanism is screwed into this screwing part. With this action, the nut member 81 is enabled to move in the arrow X direction versus the spindle 50.

The spindle 50 is inserted into the upper side first opening 42. In the extension part, a partially cut-off area is formed on the outer circumferential surface, with a specified length in the axial direction. In the said area, a pair of wall parts are formed facing the axial direction of the spindle 50.

One of the wall parts (first wall part) 54 has a contact surface contacting the brake lever 20 when the spindle 50 is advancing, and the other wall part (second wall part) 55 has a contact surface contacting the brake lever 20 when the spindle 50 is retreating. Between the two wall parts a gap is formed where a force point part 23 can be inserted.

In the connection part, a pair of flat surfaces are formed as side surfaces. These flat surfaces are positioned symmetrically versus the spindle 50 axis, and form flat, almost vertical surfaces to the axis. The above-mentioned perforation hole is opened in this connection part. In other words, since the interval between both surfaces of the connection part (width of connection part) is smaller than the diameter of the perforation hole, the perforation hole is opened on the side surface of the connection part so that each flat surface is divided into top and bottom.

An expanded diameter area is installed in this perforation hole, and a wear ring 57 is fitted into this expanded diameter area.

The brake lever 20 has the force point part 23 installed in the upper tip part (front tip part), or in other words, the upper tip part (front tip part) of the arm part 22. This force point part 23 is an area that accompanies the spindle 50 drive, and receives force from the said spindle 50, and is inserted into the space between the spindle 50 wall parts.

A guide rod is inserted into the perforation hole of the spindle 50. The base end part of the guide rod is fixed to the vehicle wheel in the casing 50 and to the sidewall 46 on the opposite side, and it is positioned in the same axial shape as the spindle 50.

A pair of flat surfaces are formed in the guide rod. When the guide rod is inserted into the spindle 50 perforation hole, these flat surfaces form a surface shape together with the flat surface of the spindle connection part.

Next is a description of the unit brake 100 operation.

FIG. 1 is a cross-section illustration of the cylinder device 10 when neither the regular brake part 60 nor the spring brake part 70 are in operation. For example, when the brake operation is not being performed while a rail vehicle is in operation, it becomes the state shown in FIG. 1. In this state, a regular brake control device (not shown in the figure) controls so that the supply of compressed air from an air supply source (not shown in the figure) by way of the first port 63 to the first pressure chamber 64 is not performed. Also, compressed air within the first pressure chamber 64 is naturally exhausted by way of the first port 63. For this purpose, the first piston 61 uses the return spring member 66 to add force in the anti-brake direction (arrow X2 direction), and the first piston 61 enters a state of contact with bottom part of the first cylinder body 62.

Meanwhile, in the state shown in FIG. 1, compressed air is supplied to the second pressure chamber 74 by way of the second port (not shown in the figure) from an air supply source (not shown in the figure), based on the control of a spring brake control valve (not shown in the figure). For this purpose, added force based on the operation of compressed air supplied to the second pressure chamber 74 puts the second piston 71 in a state of moving in the anti-brake direction (arrow X2 direction) in opposition to the added force of the spring member 75. In this state, the external gear 81a of the nut member 81, and the external gear 84a of the clutch 84 are not mutually gripping, and a state forming a gap is entered.

Figure 3:
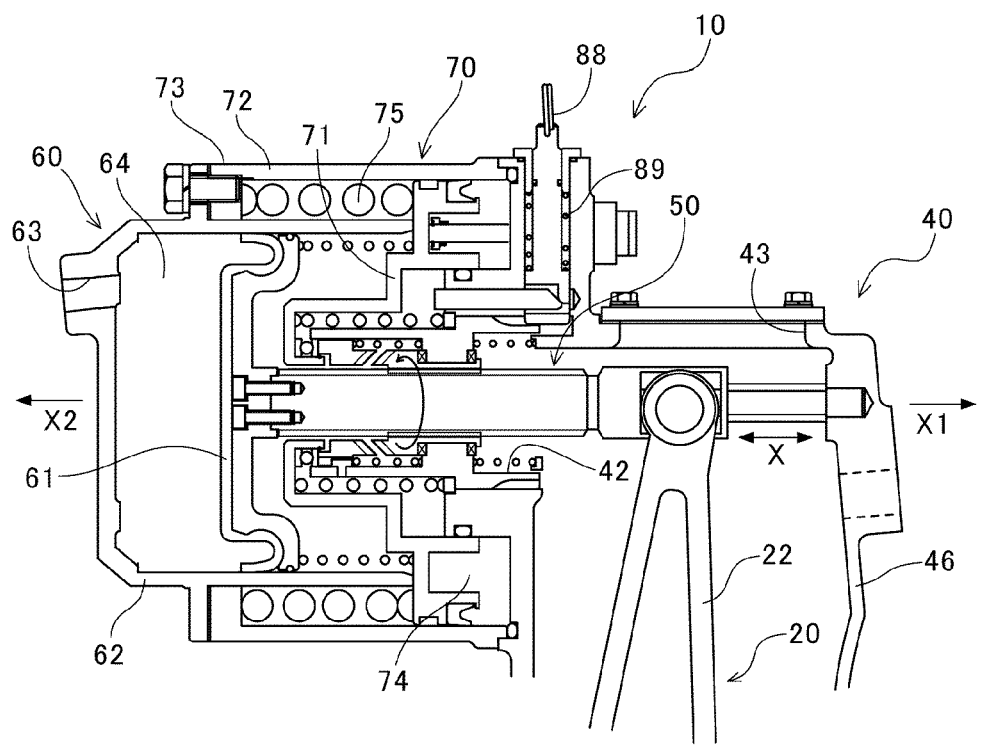
FIG. 3 Illustration showing the state when the regular brake of the unit brake in FIG. 1 is activated.

FIG. 3 is a cross-section illustration of the cylinder device 10 showing a state where the regular brake part 60 has been activated. Based on control of the regular brake control device, compressed air is supplied to the first pressure chamber 64 by way of the first port 63, to activate the regular brake part 60. At this time, the added force by use of compressed air supplied to the first pressure chamber 64 moves the first piston 61 in the brake direction (arrow X1 direction) in opposition to the added force of the return spring member 66. With this action, the spindle 50 moves in the brake direction together with the first piston 61, pushing the brake shoe against the tread surface of the vehicle wheel, to generate braking force. However, when the spindle 50 moves in the brake direction together with the first piston 61, since the nut member 81 is freely supported by the bearing 83 versus the clutch box 82, together with the spindle 50 move in the brake direction, the nut member 81 rotates while being supported by the clutch box 82. With this action, only the spindle 50 will move in the brake direction.

Figure 4:
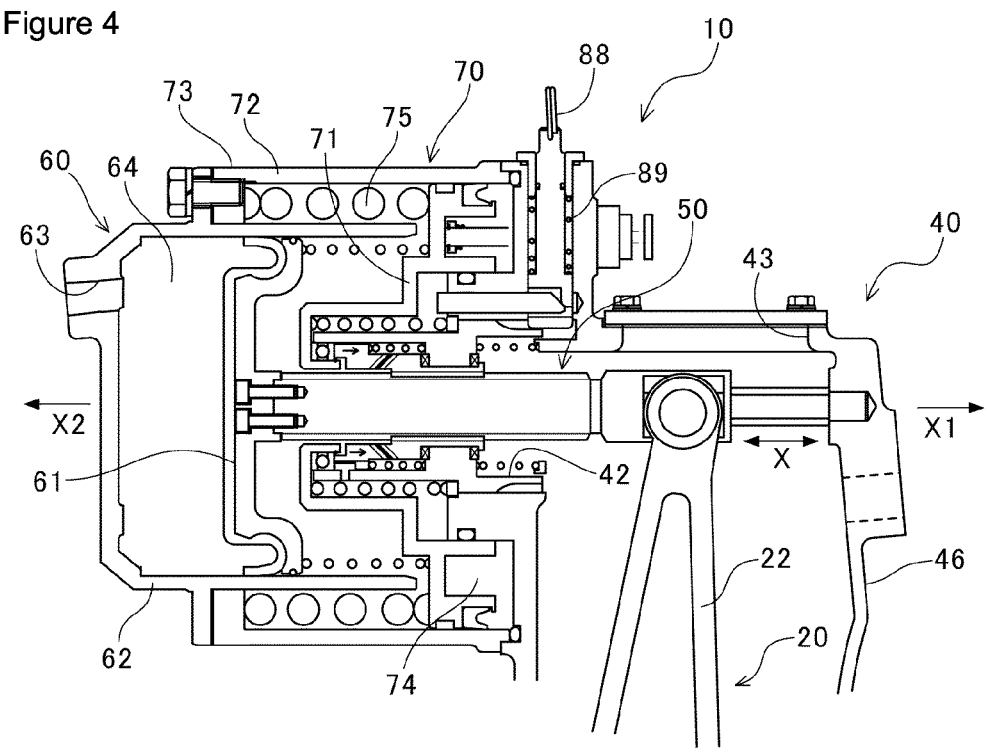
FIG. 4 Illustration showing the state when the spring brake of the unit brake in FIG. 1 is activated.

FIG. 4 is a cross-section illustration of the cylinder device 10 showing a state where the spring brake part 70 has been activated. When activating the spring brake 70, for example, in a state where the regular brake part 60 is activated (see FIG. 3) when the rail vehicle has been completely stopped, the spring brake part 70 becomes activated for use as a parking brake, etc. Based on control of the spring brake control device (not shown in the figure), compressed air is exhausted from the second pressure chamber 74 for activation.

When compressed air that has been supplied to the second pressure chamber 74 is exhausted, the added force of the spring member 75 starts the second piston 71 moving in the brake direction (arrow X1 direction). At this time, the clutch 84 that freely rotates to the thrust bearing 85 supported by the second piston 71 begins to move together with the second piston 71 in the brake direction versus the spindle 50. Note that, at this time, the clutch 84 moves in the brake direction by a sliding operation with the groove 84b and key 82a versus the clutch box 82. Also, when the second piston 71 begins in this way to move together with the clutch 84 versus the spindle 50, the clutch 84 comes into contact with the nut member 81. In other words, the external gear 81a of the nut member 81, and the external gear 84a of the clutch 84, are mutually gripping, and the nut member 81 rotation stops.

As described above, the nut member 81 and clutch 84 are mutually gripping, so that the clutch mechanism moves from a non-linked state to a linked state. Also, since the nut member 81 rotation can be stopped in this linked state, force is added to the spindle 50 by way of the clutch 84 and nut member 81 when the second piston 71 is moving in the brake direction based on the added force of the spring member 75, and the spindle 50 is maintained in the state where the first piston 61 and spindle 50 are moving in the brake direction. In other words, it is maintained in the state where the spring brake part 70 is activated and the spring brake force is used.

<Characteristics of Unit Brake 100 in this Embodiment>

As described above, in the Embodiment, the clutch 84 facing the nut member 81 around the spindle 50 is positioned in an anti-brake direction versus the nut member 81, and when the clutch mechanism is moving in a linked state, the clutch 84 moves together with the second piston 71 to mutually grip with the nut member 81. Also, the nut member 81 that is screwed in to the spindle 50 and rotatably supported is supported to enable movement in the anti-brake direction. For this reason, the first pressure chamber 64 compressed fluid in the regular brake part 60 is slowly outgassed, causing the added force of the first piston 61 based on activation of the first pressure chamber 64 to weaken, and when the first piston 61 is pushed in the anti-brake direction by spring-back reaction force from the brake shoe side, the nut member 81 is pushed deeply in the mutually gripping direction toward the clutch 84. With this action, even if the first pressure chamber 64 compressed fluid is outgassed and the spring-back reaction force from the brake shoe side is activated, disengagement of the nut member 81 and clutch 84 mutually gripping pat in the clutch mechanism is prevented. For this reason, unintentional relaxation of the brake force in the spring brake part 70 used as a parking brake, etc., is prevented.

Furthermore, in the Embodiment, since the clutch mechanism is positioned in a region that does not interfere with the first pressure chamber 64 and second pressure chamber 74, it can prevent the size of the cylinder device 10 from growing larger. Particularly since it does not generate a protruding part like that in the unit brake listed in Patent Citation 2, it can prevent the outward form of the cylinder device from growing larger. As a result, an existing unit brake can be replaced with the unit brake 100 where the spring brake is not unintentionally relaxed, without needing to make any changes to the configuration on the rail vehicle side.

And again furthermore, in the Embodiment, since the first pressure chamber is installed in the anti-brake direction of the clutch 84 box holding the bearing 83, the bearing 83 is not exposed to compressed fluid, and in the same way, since the second pressure chamber 74 is installed on the outer side of the clutch 84 box holding the bearing 83 on its inner side, the bearing 83 is not exposed to the compressed fluid. In other words, since the bearing 83 surroundings are filled with air from outside, and since the grease coating the bearing will not deteriorate due to oil or water incorporated in the compressed fluid, performance can be maintained even over long-term use.

In addition, in the Embodiment, since a gap traversable by fluid is formed between the sidewall and the spindle 50, and between the clutch 84 and spindle 50, air from the outside is fully supplied by way of this gap to inside the space contained in the return spring member 66. It follows that, even when the atmosphere is temporarily humid, if the atmosphere afterward becomes drier, the atmosphere around the bearing also dries out. As a result, prevention of deterioration of the grease coating the bearing 83 due to a humid atmosphere can be more certainly suppressed.

Other Example

Here follows descriptions of another example. For this other example, the description will be mainly of points that differ from the above-mentioned Embodiment.

Figure 5:
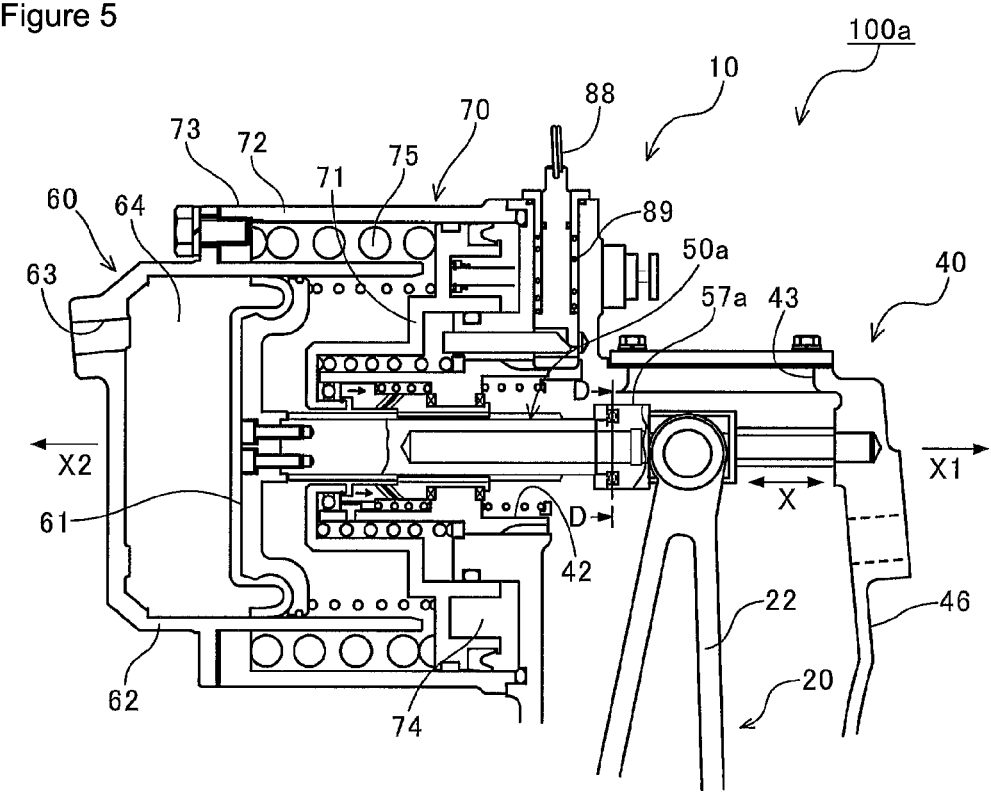
FIG. 5 Cross-section illustration showing unit brake in other examples.
Figure 6:
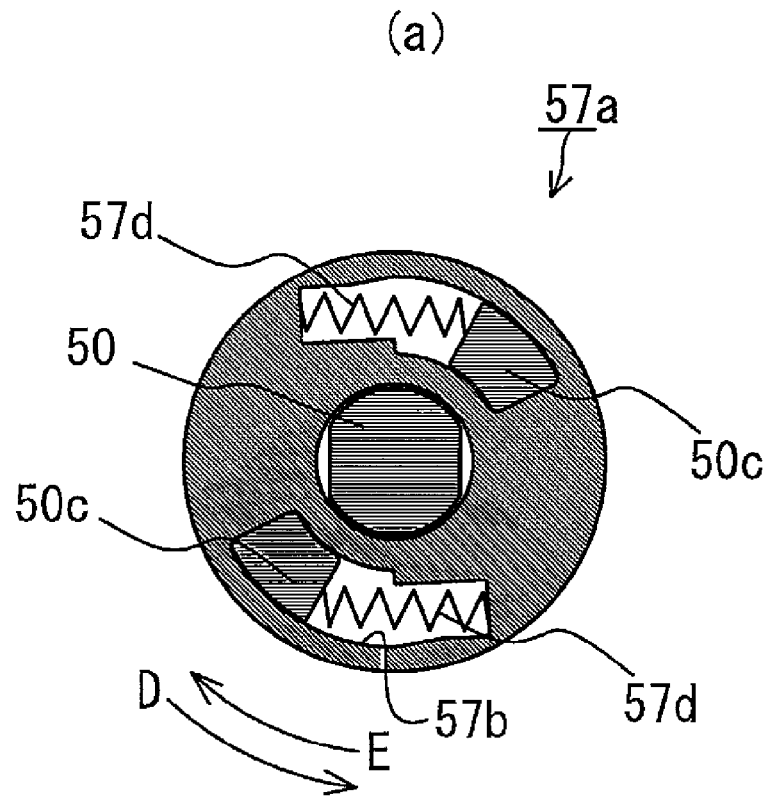
FIG. 6 Cross-section illustration at the D-D line arrow position in FIG. 5.
Figure 6:
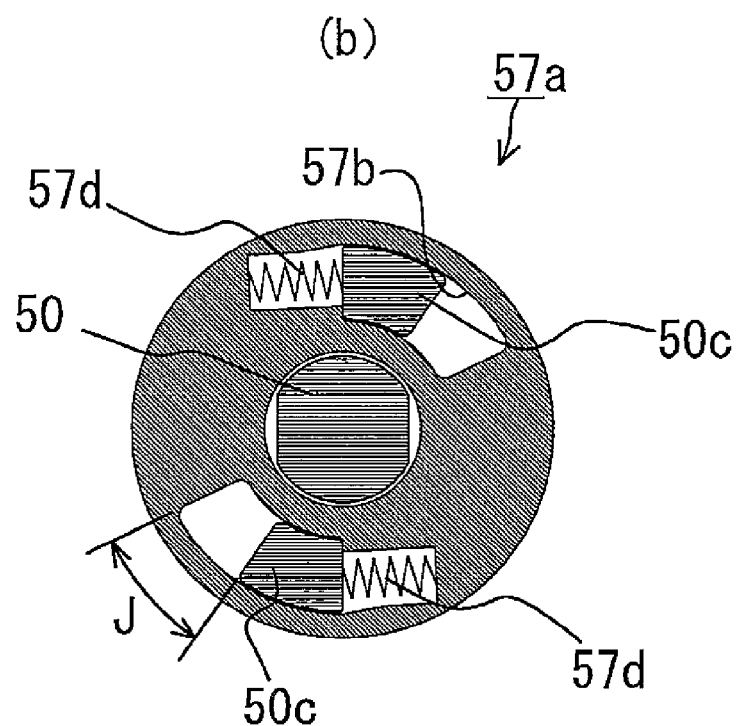

As shown in FIG. 5, the unit brake 100a is equipped with a spindle 50a in place of the spindle 50. The spindle 50a is equipped with a holding case 57a. FIG. 6(a), (b) is an illustration showing a cross-section of the holding case 57a, and as shown in FIG. 6(a), the spindle 50a uses a rotation added force spring 57d to add force in a reverse rotation direction (arrow E direction in the figure) to the rotation direction where the nut member 81 is deeply screwed into the spindle 50a by way of a pin member 50c.

For this reason, in a state where the tip parts of the external bearing 81a and external bearing 84a are in contact with each other, as shown in FIG. 6(a), the spindle 50a maintains its position with the pin member 50c in a state of engagement with the stepped part of the inner wall of the holding case 57a.

Here, if in a state where the spring brake method is fully activated, utilization in the spindle 50a of the rotation force in the rotation direction shown at arrow D in FIG. 6(a) puts the spindle 50a in a state enabling rotation in that rotation direction. Also, the spindle 50a comes to rotate in the rotation direction (rotation direction at arrow D in FIG. 6(a)) where the nut member 81 is deeply screwed into the spindle 50a in opposition to the spring force of a rotation added force spring 57d activated in the pin member 50c. With this action, the nut member 81 moves slightly in the same direction as the brake direction, and is slightly rotated, to enable deep screwing into the spindle 50a. Also, the contact position of the external bearing 81a and external bearing 84a is moved slightly from the position where the tip parts are in contact with each other, so that the external bearing 81a and external bearing 84a are adjusted to a deeper mutually gripping position.

In addition, the spindle 50a is rotatable in a direction shown by the arrow in FIG. 3 until both tips of the pin member 50c contact a protrusion wall part 57b in the inner wall of the holding case 57a. In other words, the pin member 50c becomes capable of swiveling in the angle range shown at both tips arrow J in FIG. 6(b), and the rotatable angle of the spindle 50a is regulated.

Also, if the external bearing 81a and external bearing 84a are deeply mutually gripping, and the clutch 84 is in a mutually gripping state, a latch bearing 82c of the nut member 81, and a lock bearing 88a of the lock lever 88 are in a state of engagement, so that linked rotation to rotation accompanying the movement of the nut member 81 in the brake direction is stopped. For this reason, rotation of the nut member 81 can be eventually stopped.

Note that if the clutch 84 is in a mutually gripping state, the nut member 81 moves together with the second piston 71 slightly in the brake direction in opposition to the added force of the rotation added force spring 57d, and the engagement of the latch bearing 82c of the nut member 81, and the lock bearing 88a of the lock lever 88, deepens in the axial direction so that the second piston 71, the nut member 81, and the clutch 84, become stopped.

As described above, the external bearing 81a and external bearing 84a are mutually gripping, and the nut member 81 and clutch 84 move from a non-linked state to a linked state. Also, in the linked state, since the nut member 81 rotation is stopped, the second piston 71 uses the added force of the spring member 75 to add force to the spindle 50a by way of the clutch 84 when in a state moving in the brake direction, and a state where the spindle 50a and the first piston 61 remain moved in the brake direction is maintained as is. In other words, the spring brake force is maintained in an activated state.

Note that the reaction from the brake shoe receptacle 30 pushed against the tread surface of the vehicle wheel is activated in the anti-brake direction versus the first piston 61 and the spindle 50a, so that even when the nut member 81 and the clutch 84 are about to be disengaged, there is no disengagement because the mutual gripping is so deep, and the first piston 61 and spindle 50a are maintained in the brake state position.

For example, in cases where wanting to use a tractor vehicle to slightly move the parking position of a rail vehicle without going so far as to activate the air compression function, cases where power is not supplied to the rail vehicle so that a tractor vehicle is used to move the rail vehicle, or other such where wanting to release the spring brake force, the lock lever 88 can be operated to manually release the spring brake force. In this case, if manual operation is used to pull up the lock lever 88 from the state where the sub brake is activated, toward the outer side of the first cylinder body 62, the lock bearing 88a of the lock lever 88 is disengaged from the latch bearing 82c of the nut member 81. Also, it becomes rotatable with the external bearing 81a and external bearing 84a remaining in a state of mutual gripping, and the clutch 84 becoming empty spinning.

With this action, both the first piston 61 and the second piston 71 can use the added force of the return spring member 66 and the spring member 75 to mutually move to the stroke end, and the spindle 50a and the first piston 61 come to move in the anti-brake direction. In this way, the lock lever 88 can be operated to manually release the spring brake force and move the rail vehicle, etc.

In the other example above, the effectiveness of the Embodiment was successfully obtained, and the following effectiveness was also successful. In the other example, grease was coated even within the holding case 57a, but since use occurred in the atmosphere, there was no exposure within compressed air. Therefore, deterioration of the grease (lubricating material, etc.) due to oil or water incorporated in the compressed fluid can be suppressed. As a result, performance can be maintained even over long-term use.

While the above was a description based on the illustrations regarding the Embodiment of this Invention, it is important to remember that the specific configuration is not limited to these Embodiments. The scope of this Invention is shown not only through the description of the above-mentioned Embodiments, but also through the scope of the Patent Claims, and all changes are incorporated within the scope of the Patent Claims and the scope of equivalent meanings.

(Correspondence Relationship of Each Configuration Elements the Claims, to Each Part in the Above-Mentioned Embodiments)

In the above-mentioned Embodiments, the unit brakes 100, 100a correspond to "unit brake", the spindles 50, 50a correspond to "spindle", the cylinder device 10 corresponds to "cylinder device", the brake lever 20 corresponds to "brake lever", the brake shoe receptacle 30 corresponds to "brake shoe receptacle", the first pressure chamber 64 corresponds to "first pressure chamber", the return spring member 66 corresponds to "first spring", the first piston 6 corresponds to "first piston", the regular brake part 60 corresponds to "regular brake part", the second pressure chamber 74 corresponds to "second pressure chamber", the spring member 75 corresponds to "second spring", the second piston 71 corresponds to "second piston", the spring brake part 70 corresponds to "spring brake part", the nut member 81 corresponds to "nut member", the clutch 84 corresponds to "clutch", the clutch box 82 corresponds to "clutch box", the bearing 83 corresponds to "bearing", and the clutch mechanism corresponds to "clutch mechanism".

The invention claimed is:

1. A unit brake comprising a cylinder device with a spindle positioned in a casing in fluid communication with the atmosphere, a brake lever capable of swivel motion around a support axis through movement of the spindle in a spindle axial direction, and a brake shoe receptacle linked to and driven by the brake lever, comprising:
   a regular brake part equipped with a first piston, the first piston operating in a first pressure chamber and engaged by a first spring positioned in a region of the casing in fluid communication with the atmosphere and, with compressed fluid supplied to the first pressure chamber, the regular brake part moves in a direction of a brake force generated by the first piston in resistance to the first spring,
   a second piston operating in a second pressure chamber opposing the first pressure chamber, the second piston arranged between the first pressure chamber and the second pressure chamber, the second piston engaged by a second spring installed concentrically outside of the first pressure chamber, wherein the spindle is installed maintaining and penetrating a specified gap in a central part of the second piston, and wherein a spring brake part moves from a state of supplying compressed fluid to the second pressure chamber to an exhausting state where the second piston moves in the brake force direction by the second spring,
   a nut member rotatably threaded on the spindle, and
   a clutch mechanism, comprising:
   a clutch box housing the nut member,
   a bearing rotatably supporting the nut member relative to the clutch box, and
   a clutch positioned opposing the nut member,
   wherein the clutch mechanism allows rotation of the nut member versus the spindle when the regular brake part is driven, and fixes the nut member versus the spindle when the spring brake part is driven,
   wherein the clutch mechanism transitions from a first state where compressed air is supplied to the second pressure chamber to a second state where the compressed air is exhausted and the clutch is moved together with the second piston in the brake force direction versus the spindle by the added force of the second spring member to set a linked state where the clutch is mutually gripped with the nut member and linking the spindle and the second piston,
   wherein in the first state where compressed air is supplied to the second pressure chamber, the clutch is separated from the nut member and the nut member is freely rotatable and the clutch mechanism is set to a non-linked state where the link between the spindle and the second piston is released, wherein when the clutch mechanism is in the non-linked state, the second piston is biased towards the first piston by the compressed air in the second pressure chamber, wherein a clutch disengagement spring is positioned concentrically on an outer side of the nut member and applies force in a direction away from the nut member, wherein the nut member comprises an external gear facing a counter-braking direction that is a direction opposite to a brake force direction, wherein the clutch comprises an external gear facing the brake force direction, and wherein the external gear of the nut member meshes with the external gear of the clutch when the clutch mechanism is in the linked state.

2. The unit brake of claim 1, further comprising a key fixed within the clutch box and positioned within a groove in the clutch to link the clutch box and clutch, such that rotation between the clutch and the clutch box is restricted and sliding movement in the spindle axial direction is enabled.

3. The unit brake of claim 1, further comprising a clutch box stay spring installed between the clutch box and the second piston.

* * * * *